(12) United States Patent
Falzone

(10) Patent No.: US 6,592,656 B2
(45) Date of Patent: Jul. 15, 2003

(54) WATER APPARATUS FOR TREATING INDUSTRIAL WASTE PRODUCTS

(75) Inventor: Alberto Falzone, Aci Catena (IT)

(73) Assignee: Chemitronic s.r.l., Pantano d'Arci (IT)

( * ) Notice: Subject to any disclaimer, the term of this patent is extended or adjusted under 35 U.S.C. 154(b) by 99 days.

(21) Appl. No.: 09/892,551

(22) Filed: Jun. 28, 2001

(65) Prior Publication Data

US 2002/0000162 A1 Jan. 3, 2002

(30) Foreign Application Priority Data

Jun. 30, 2000 (IT) .................................. MI2000A001481

(51) Int. Cl.[7] .......................... B01D 47/10; B01D 47/12; B01D 47/06
(52) U.S. Cl. ............................ 96/246; 96/248; 96/262; 96/275; 96/280; 96/323
(58) Field of Search .......................... 96/243, 244, 246, 96/247, 248, 262, 269, 270, 275, 276, 277, 278, 279, 280, 322, 323, 329; 261/DIG. 54

(56) References Cited

U.S. PATENT DOCUMENTS

| | | | |
|---|---|---|---|
| 1,409,593 A | * | 3/1922 | Schram |
| 1,940,197 A | * | 12/1933 | Wagner |
| 2,200,891 A | * | 5/1940 | Nyborg |
| 2,484,277 A | * | 10/1949 | Fisher |
| 2,585,440 A | * | 2/1952 | Collins |
| 3,239,999 A | * | 3/1966 | Price |
| 3,339,344 A | * | 9/1967 | Pallinger |
| 3,403,498 A | | 10/1968 | Pasha |
| 3,448,562 A | * | 6/1969 | Wisting |
| 3,815,332 A | * | 6/1974 | Bobrowsky et al. |
| 3,856,487 A | * | 12/1974 | Perez |
| 4,231,765 A | | 11/1980 | Scott |
| 4,469,493 A | * | 9/1984 | Tuovinen et al. |
| 4,676,811 A | | 6/1987 | Wade |
| 5,649,985 A | * | 7/1997 | Imamura |
| 6,391,099 B1 | * | 5/2002 | Ina et al. |
| 2002/0000162 A1 | * | 1/2002 | Falzone |

FOREIGN PATENT DOCUMENTS

DE           3031951 A1      3/1981

* cited by examiner

*Primary Examiner*—Duane S. Smith
(74) *Attorney, Agent, or Firm*—Pillsbury Winthrop LLP

(57) ABSTRACT

There is provided apparatus for treating water containing industrial waste products. A first tank contains water at a determined pressure. A second tank is placed inside the first tank and communicated with a lower portion thereof. It contains water at a lower pressure than that of the first tank. An inlet device of the discharge product is located in the second tank. A first dilution sector of the waste product is external to the tanks but in communication with the second tank at one end and connected to the other end with a Venturi tube and has an outlet duct for waste product diluted by said second tank. The Venturi tube is in communication with the first tank and creates a depression of the second tank with respect to the first tank. The second tank has an internal portion for the dilution of the industrial waste product.

21 Claims, 5 Drawing Sheets

WATER APPARATUS FOR TREATING INDUSTRIAL WASTE PRODUCTS

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) INCORPORATION-BY REFERENCE OF MATERIAL SUBMITTED ON A COMPACT DISC

Not Applicable

(e) BACKGROUND

The present invention refers to a water apparatus for treating industrial waste products, in particular liquid or gaseous products.

Many industrial processes use chemical substances for processing products, such as in the field of processing semiconductors or in the production of chemical and pharmaceutical substances. The production chemical substances or waste chemical substances, once released into the air, can cause serious damage to things or to people. Several combinations of such substances, in addition to being toxic, corrosive or poisonous, can also be carcinogenic or can in time trigger off mutations of animal and vegetable cells.

For said purpose, apparatuses are known in the field of the technique which, by means of various technical solutions, permit the treatment of waste industrial products to limit the degree of environmental pollution.

Amongst these apparatuses there are water apparatuses in which the industrial waste products, for example, waste industrial gas, are treated with water so as to pass to the water itself those chemical substances that make them noxious.

(f) SUMMARY

A water apparatus for the treatment of industrial waste products comprises a first tank containing water at atmospheric pressure and a second tank inside the first closed in the upper part and in communication with it in the lower part, a device for the inlet of the gas in the second tank, a Venturi tube suitable for assuring a negative pressure in the second tank with respect to the first, and at least one gas dilution sector placed at the output of the second tank.

At present said water apparatuses for the treatment of industrial waste products lack in efficiency of dilution and elimination in the gas passage stages. Said apparatuses do not maintain technical characteristics suitable for making the process equipment connected to them operate well, in the inlet stages of the gas to be treated and they are not able to block the water vapor generated by the same apparatuses which, coming backwards, cause damage to the equipment or contaminate the processes in operation in the production equipment.

In addition, the present apparatuses do not maintain a constant negative pressure in the gas inlet tank, creating malfunctioning and dangerous overpressures in the process equipment connected to them, with a high risk of breakage of the apparatuses. The same apparatuses use an excessive quantity of water for treating the gas.

In view of the state of the technique described, the object of the present invention is to construct a water apparatus for the treatment of industrial waste products which has a high elimination and depuration efficiency.

In accordance with the present invention, said object is reached by means of a water apparatus for treating industrial waste products comprising a first tank containing water at a determined pressure, a second tank placed inside said first tank with which it is in communication in the lower part and which contains water at a pressure lower than that of said first tank, an inlet device of the waste product in said second tank, a first dilution sector of said waste product which is external to the tanks but in communication with said second tank at one extremity and connected to the other extremity with a Venturi tube, said Venturi tube being in communication with said first tank and being suitable for creating the depression of said second tank with respect to the first tank, and an outlet duct of the waste product diluted by said second tank, characterized in that said second tank comprises internally a further sector for the dilution of said industrial waste product.

In addition the apparatus according to the invention preferably comprises an inlet unit for the industrial waste product equipped with a scroll system for the forced inlet with rotation of the industrial waste product in the second tank, further waste product dilution sectors external to the second tank but which are in communication with it, and a mechanical device for the regulation of the pressure in the second tank.

Thanks to the present invention a water apparatus for treating industrial waste products can be formed, in particular for liquid or gaseous products which has a high degree of elimination of noxious chemical substances. In addition it maintains all the characteristics constant even to the variation of the flows of the waste products to be treated and eliminates returns of water vapor into the equipment through connecting tubes between the production equipment and the elimination apparatus, and observes all the specification conditions of the process equipment connected to it.

In addition the apparatus according to the invention permits economy in the consumption of water which is necessary for the treatment of the waste products, using circuits controlled in proportion to the quantity of the chemical substances to be treated.

(f) BRIEF DESCRIPTION OF THE SEVERAL VIEWS OF THE DRAWINGS(S)

The characteristics and the advantages of the present invention will appear apparent from the following detailed description of an embodiment thereof, illustrated as non-limiting example in the enclosed drawings, in which.

(h) DETAILED DESCRIPTION

Figure 1:
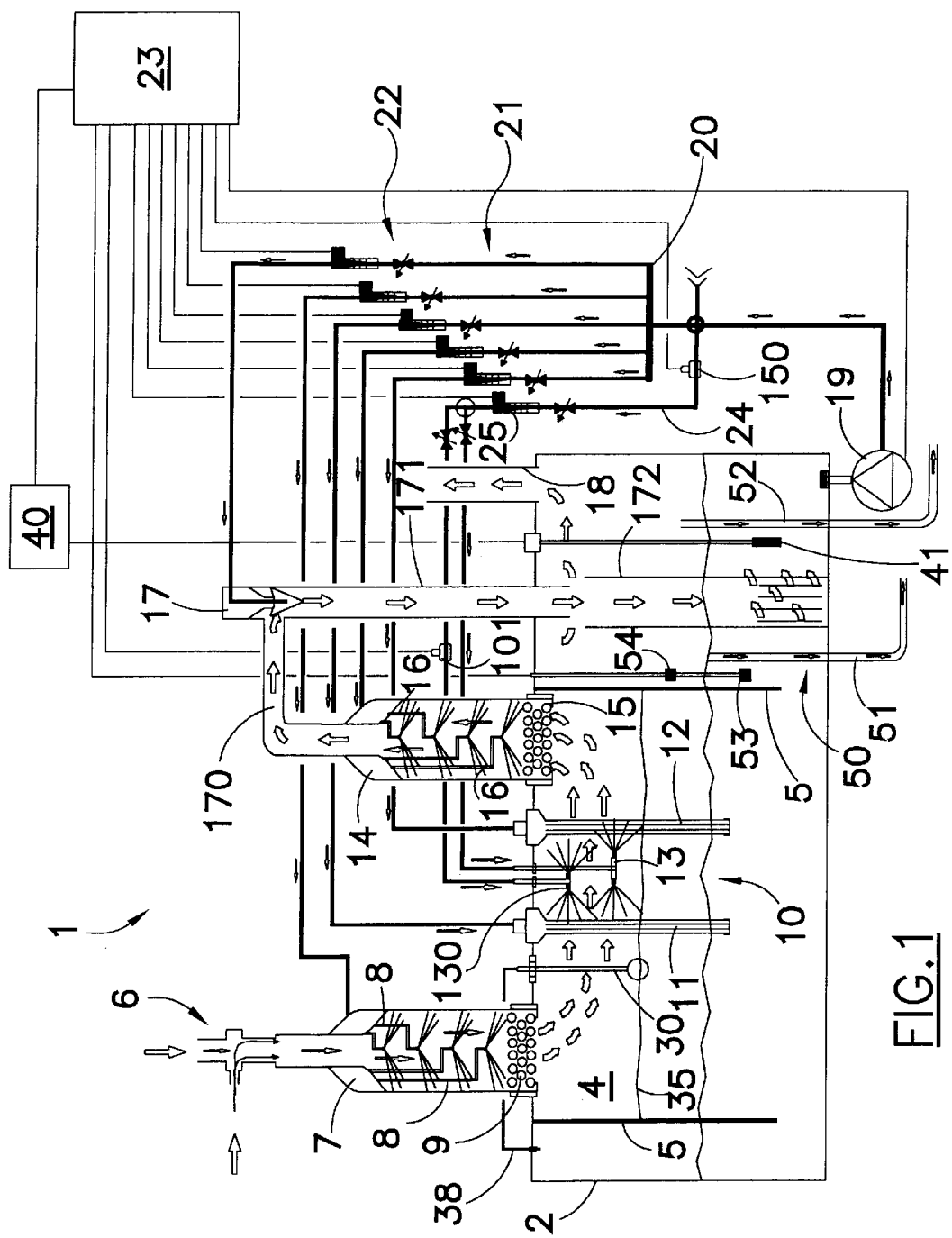
FIG. 1 is a schematic view of the whole apparatus according to the present invention.
Figures 2, 3:
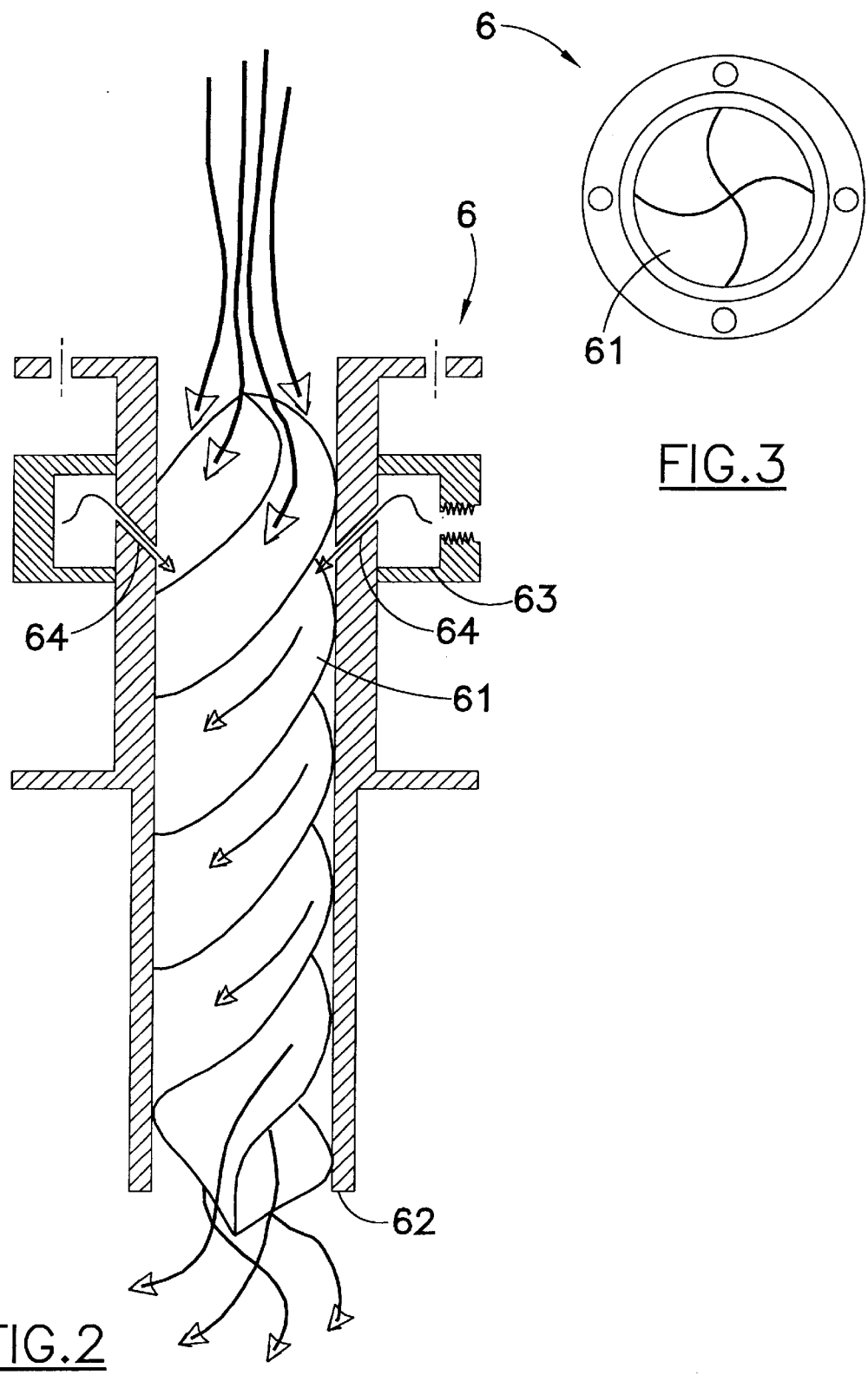
FIG. 2 is a section view according to a vertical plane of the inlet unit of the waste industrial products of the apparatus of FIG. 1.
FIG. 3 is a top view of the unit in FIG. 2.

With reference to FIG. 1 a water apparatus 1 is shown for the treatment of industrial waste products, for example gas. The apparatus 1 comprises a tank 2 containing a quantity of water at atmospheric pressure with a level which is predefined in proportion to the types and the quantities of waste product to be treated and a process tank 4 placed inside the tank 2. The tank 4 is closed in the upper part and the lower part communicates with the tank 2 from which it is separated on the side by means of separation walls 5; the tank 4 contains water at a level 35. The apparatus 1 comprises in addition an inlet unit 6 for the gas inlet, more visible in FIGS. 2 and 3, which, given its project, prevents the return of water vapors into the production machines connected to the apparatus 1. The gases from the inlet unit 6 pass to a first cap-like container 7 connected to the process tank 4 which comprises four helicoidal water jet sprays, known in themselves and generally indicated with 8, and positioned axially so as to create a forced passage for the inlet gas. A sieve 9 is positioned in the lower extremity of the container 7. The gas passes into the tank 4 and goes through a device 10 inside the tank 4 which consists of two barriers 11 and 12 having walls provided with reticulated inserts of the mosquito netting type inside which the water flows at a certain pressure, and two conical waterjet sprays, known in themselves and generally indicated with 13 and 130. The gas then passes through a second cap-like container 14, similar to the container 7, which is outside the tank 4 but communicates with it and which is provided with a sieve 15 and four helicoidal water jet sprays, known in themselves and generally indicated with 16 and they also positioned axially.

The gas passes through a Venturi tube 17 connected to the container 14 by means of a duct 170 and then goes through an outlet duct 18 after being freed of the noxious chemical substances that it contained.

The water used in the sprays 8 of the container 7, in the sprays 16 of the container 14, in the vertical barriers 11 and 12, and in the Venturi tube 17 comes from the same tank 2. In fact by means of a recycling pump 19 connected to the same tank 2 the water is sucked up and sent at a pressure comprised between two or three atmospheres to a distribution collector 20 connected to ducts, generally indicated with 21, each one of which is connected to the above mentioned elements and which are equipped with flow control valves 22 controlled by an electronic device 23 to determine the pressure of the water in those ducts. The water used in the sprays 13 and 130 of the device 10 is instead fresh water, not recycled; the sprays 13 and 130 are also connected respectively to two ducts equipped with relative water flow control valves connected in turn to a duct 24 equipped with a valve 25 controlled by the same electronic device 23.

The apparatus 1 also comprises a pressure control unit 30 positioned inside the process tank 4, a water Ph control unit 40 and a device 50 for discharging the noxious chemical substances of the waste product which consists of a first discharge tube 51 and a second discharge tube 52 positioned higher than the first discharging tube 51 and which starts functioning when the tube 51 is blocked. The device 50 also comprises two sensors 53 and 54 connected to the electronic control device 23 to signal that tube 51 or tube 52 are blocked.

Apparatus 1 previously described functions as per the following description.

The pump 19 sucking up the water of the tank 2, sends it at a pressure comprised between two and three atmospheres to the distribution collector 20 and in turn to the various ducts 21; a part of this water enters the Venturi tube 17 to create a depression inside the tank 4. The depression created by the Venturi tube 17 in the duct 170, makes the tank 4 keep in negative pressure compared to the tank 1 at atmospheric pressure. This phenomenon ensures that the level 35 of the water of the tank 4 physically rises the value in millimeters of water column equal to the depression in millimeters of water column generated by the Venturi tube 17.

The depression of the tank 4 sucks up the gas through the container 7 and the inlet unit 6. The latter, more clearly visible in FIGS. 2 and 3, has a scroll system 61 having four sections inside it which divide the gas into four parts, making it leave from the lower part 62 of the inlet unit 6 in a rotary manner. The speed of the gas is further increased by the inlet of nitrogen or of inert gases inside each section of the scroll system 61 through a manifold 63 and passage holes 64 oriented in the direction of the gases, that is from up to down and inclined according to the rotation angle of the scroll system 61. This system blocks any water vapor which, because of physical phenomenon, attempt to go up again through the inlet unit 6.

Once the gas has left the inlet unit 6, it is forced to pass through the water barriers created by the helicoidal water jets of the sprays 8 and through the sieve 9 of the container 7, obtaining a first dilution due to the strong and violent contact with the water.

The gas enters the tank 4 at negative pressure compared to the tank 2 and is forced to pass through the device 10, that is it must pass the two vertical water barriers of the walls 11 and 13, where it undergoes a further dilution. Given the high speed of the water, all the polymers or the remaining solid substances are removed and expelled towards the bottom of the tank 1. The quantity of fresh dilution water that goes in the sprays 130 of the device 10 is regulated by a proportional valve 101 which, piloted electrically by the electronic device 23, regulates the flow of the water in the sprays 130 proportionally to the Ph recorded by the reading probe 41 of the Ph control unit 40 in turn connected to device 23 that controls all the conditions and the commands of the apparatus 1.

The gas that has passed device 10 is forced to rise in the second container 14 passing through the sieve 15 positioned on the bottom of the same container and then through four other water barriers created by the helicoidal water jets of the sprays 16 undergoing a further strong dilution.

The gas forced to pass through the Venturi tube 17, by means of the duct 170, undergoes another final strong dilution with all the water that the Venturi tube 17 needs (about 4000 liters per hour). The gas passes through a duct 171 that goes inside a second duct 172 so as to block all the nebulizations that the impact of the water coming from the duct 171 has with the violent contact of the water contained in the main tank 1.

At this point all the chemical substances and the polymers are completely mixed and trapped by the water, which, renewed by the fresh water by means of the sprays 13 and 130, overflows from the discharge device 50 carrying away all the chemical substances and the solid substances towards the ducts of the industrial discharges. The second discharge tube 52 is positioned at a higher position than the main discharge tube 51 so that, should the main discharge tube 51 be clogged, the water can flow out of the second discharge tube 52, and prevent the water from overflowing through the inlet unit 6 and towards the process equipments seriously damaging them. Should the main discharge tube 51 get clogged and the level of the water rise towards the level of activation of the second discharge tube 52, the sensor 53 connected to the device 23 signals the anomaly. Should the second discharge tube 52 get clogged for other anomalies, the sensor 54 signals it to the device 23 which blocks the inlet of fresh dilution water by means of a valve 150 controlled by the same device 23. Should the water of the tank 1 go below the level of the physical position of the sensor 53, the device 23 blocks the pump 19 to avoid breakdowns through dry working.

Sensors are also provided, which are not visible in the figures, suitable for controlling the flow of water under pressure in all the pressure ducts 21, signaling anomalies in the event the capacities are lower than those provided for.

Generally the Venturi tube 17 used is capable of giving 1000 millimeters of depression water column, therefore the level of the water of the tank 4 should rise 1000 millimeters. However normally the discharges of the production equipments need on an average a negative pressure equal to 100 millimeters of water column; the mechanical pressure stabilizer 30 assures that inside the tank 4 there are the negative pressure values required by the process equipment connected to the apparatus 1.

Figure 4:
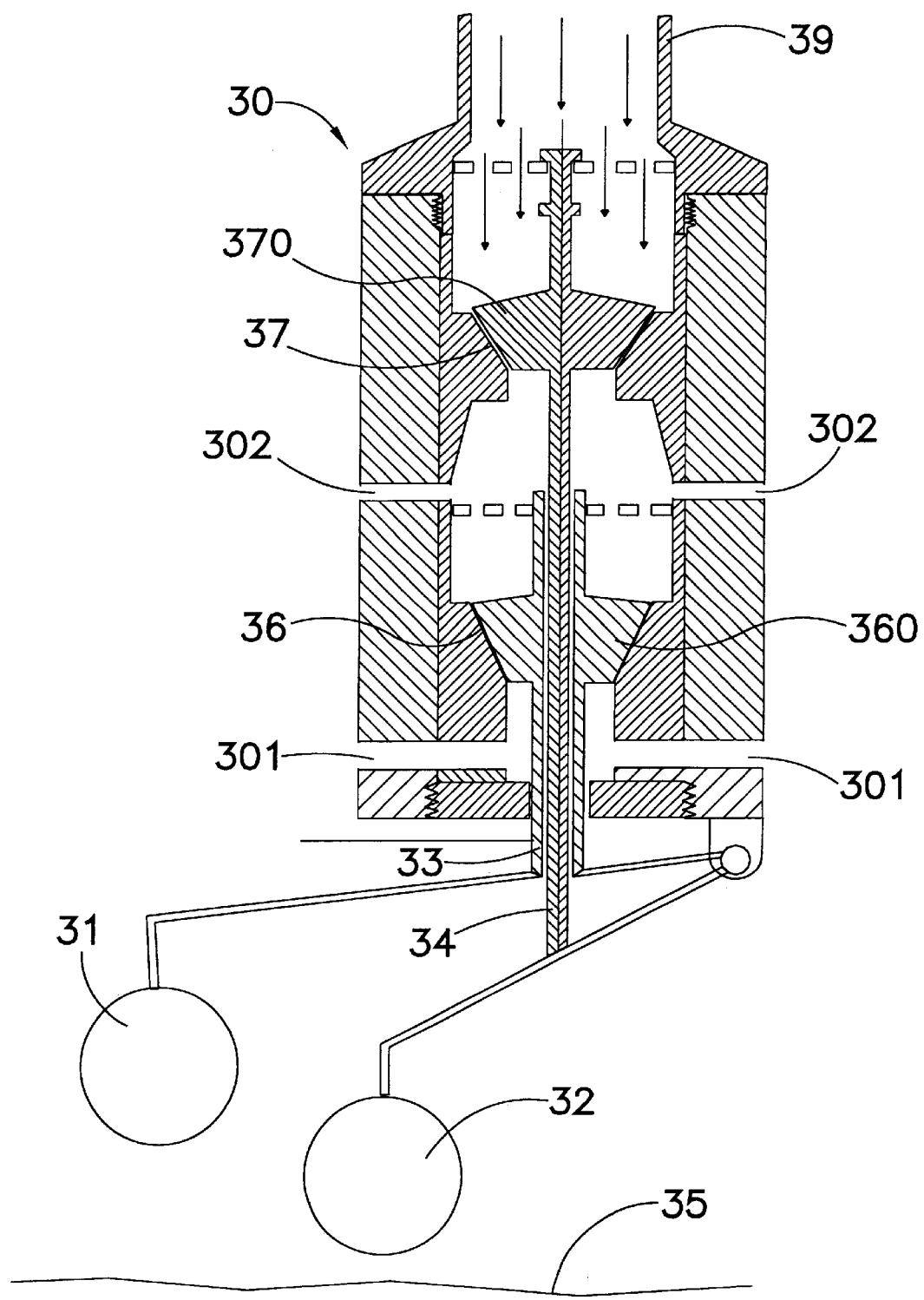
FIGS. 4–6 are seen in section according to a vertical plane of the pressure stabilizer of FIG. 1 in the various work phases.
Figure 5:
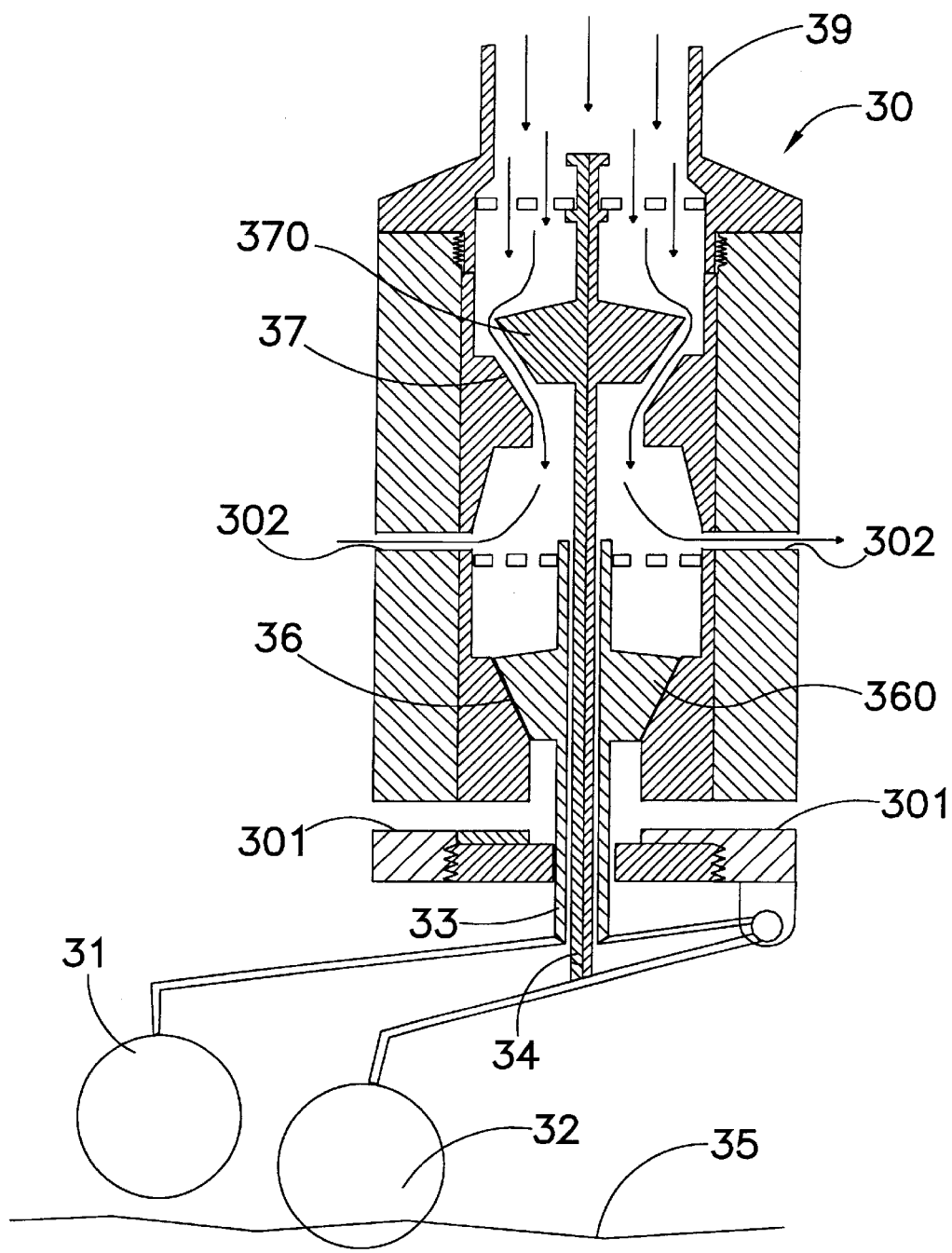
Figure 6:
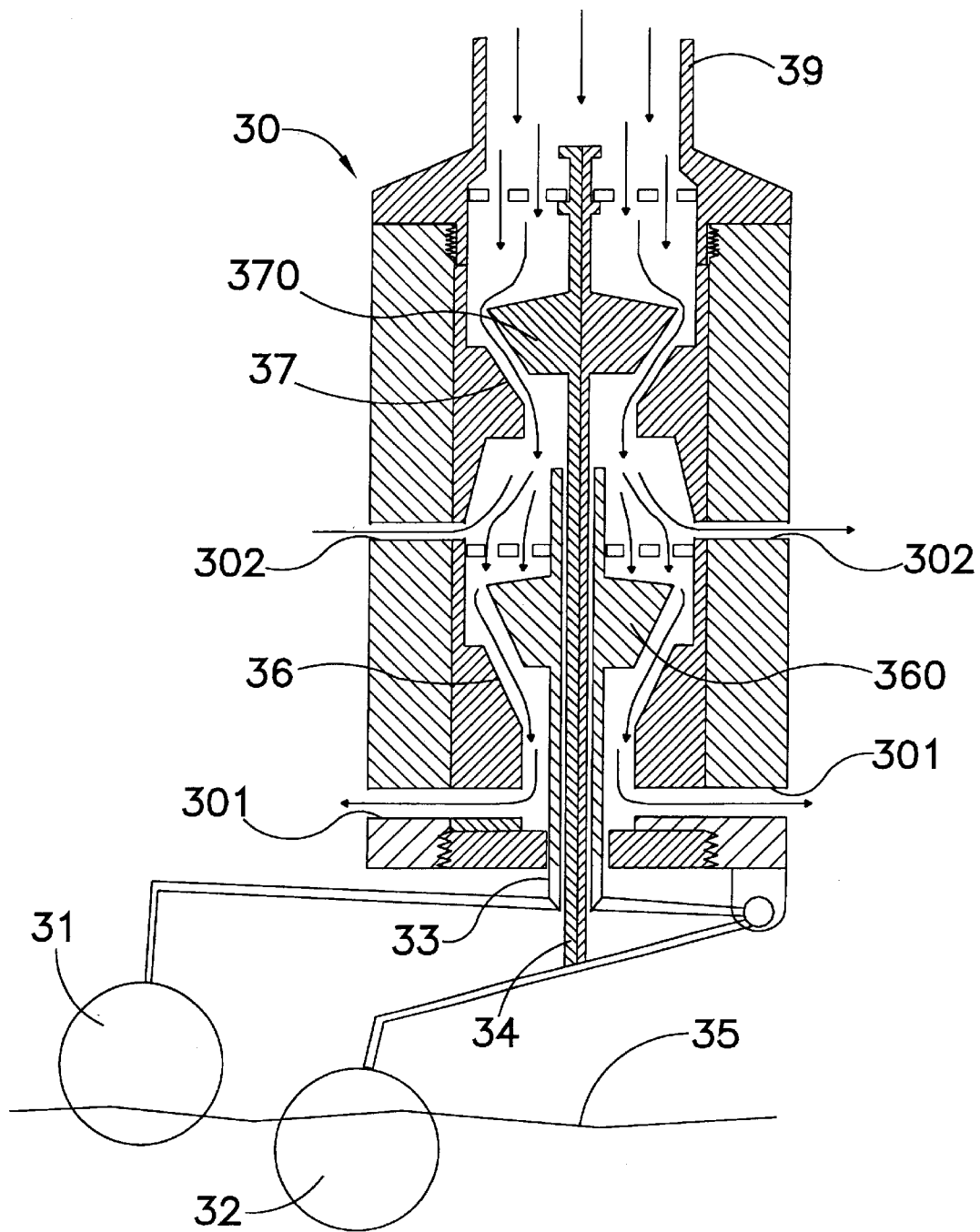

The mechanical pressure stabilizer 30, more clearly visible in FIGS. 4–6, comprises two independent floats 31 and 32, weight-calibrated to obtain a thrust without oscillation phenomena. Said floats 31 and 32 are equipped with respective vertical axes 33 and 34 integral with bodies 360 and 370 which are usually positioned like a plug in conical seats 36 and 37 inside the body of the stabilizer 30. An air vent connection is created between tank 4 and the tank at atmospheric pressure 2 through a connection duct 39 and through the conical seats 36 and 37, which open enable the air to pass through, and the vents 301 and 302 of the same stabilizer 30. With this system a negative regulation of pressure in tank 4 can be obtained, determined by the mechanical position of the pressure control unit 30.

With reference to FIG. 4, it can be deducted that when the level of the water contained in tank 4 is below the line of the two floats 31 and 32, the conical seats 36 and 37 are closed by bodies 360 and 370 and the vent air coming from duct 39 has no possibility to leave the vents 301 and 302. In this case the depression generated by the Venturi tube 17 enables the level of the water 35 to rise to a higher level.

When the level of the water reaches the level of the float 32 the same float 32 through its axis 34 pushes the body 370 upwards enabling the conical seat 37 to open, which comes about proportionally to the level of the water, enabling the vent air to pass in a fine proportional manner through the vents 302, as can be seen in FIG. 5. If the quantity of air that passes from the conical seat 37 is not sufficient to re-establish the set balance, the level of the water 35 tends to rise further and exceed the float 32.

With reference to FIG. 6 it can be deducted that when the level of the water exceeds the level of float 32, the second float 31 pushes the body 360 upwards by means of its axis 33 enabling the conical seat 36 to open, enabling the vents 301 to let a greater quantity of vent air pass to re-establish the balance of the pressure in the tank 4 again. In this case therefore both the seat 36 and the seat 37 are open and the vent air can be expelled through vents 301 and 302. The dimensions of the conical seat 36 are designed so that, for example, a minimum pressure of 10 millimeters of water column of depression can be stabilized even when the Venturi tube 17 generates a negative pressure equal to 1000 millimeters of fine water column at a maximum vent capacity equal to about 36 m$^3$/hour.

What is claimed is:

1. Water apparatus for treating industrial waste products comprising:

a first tank containing water at a determined pressure, a second tank positioned inside said first tank and with which it is in communication in the lower part and which contains water at a lower pressure than that of said first tank, an inlet device of the waste product in said second tank, and a first dilution sector of said waste product which is external to the tanks but in communication with said second tank at one end and connected to the other end with a Venturi tube, said Venturi tube being in communication with said first tank and being suitable for creating the depression of said second tank with respect to first tank, and an outlet duct of the waste product diluted by said second tank, wherein said second tank comprises internally a further sector for the dilution of said industrial waste product.

2. Apparatus according to claim 1, wherein said additional sector for the dilution of the industrial waste product comprises two walls equipped with netting inserts through which water at a given pressure flows, said walls being perpendicular to the flow direction of the waste product, said further dilution sector comprising conical waterjet sprays placed between said walls, the water of said sprays being not recycled water.

3. Apparatus according to claim 2, further comprising a water Ph control device contained in said first tank, and wherein at least some of said sprays are equipped with valvular means to regulate their water capacity proportionally to the Ph of the water which is recorded by said water Ph control device.

4. Apparatus according to claim 1, further comprising a water Ph control device contained in said first tank.

5. Apparatus according to claim 1, wherein said inlet device of said industrial waste product comprises a unit for the forced inlet with rotation of the industrial waste product in the second tank.

6. Apparatus according to claim 5, wherein said inlet device comprises a four-section scroll system for the division of said waste product in four parts.

7. Apparatus according to claim 6, wherein said inlet device has holes for the inlet of inert gases inside each section of said scroll system, said holes being oriented according to the direction of the waste product and being inclined according to the rotation angle of said scroll system.

8. Apparatus according to claim 6, wherein said inlet device has holes for the inlet of nitrogen inside each section of said scroll system, said holes being oriented according to the direction of the waste product and being inclined according to the rotation angle of said scroll system.

9. Apparatus according to claim 1, wherein said inlet device of said industrial waste product in the second tank comprises a second sector for the dilution of the waste product.

10. Apparatus according to claim 9, wherein said second sector for the dilution of said waste product comprises a container provided with sprays with helicoidal water jet placed in an axial direction so as to create a forced passage for the waste product and with a sieve placed below the sprays.

11. Apparatus according to claim 1, wherein said first sector for the dilution of said waste product comprises a container provided with sprays with helicoidal water jet placed in an axial direction and a sieve placed below the sprays, said sieve being adjacent to said second tank.

12. Apparatus according to claim 1, further comprising a discharging device for discharging the water containing the residues of the dilution of the waste product, said discharging device comprising two discharge tubes placed at different heights so that when one of said tubes is clogged the water of the first tank flows through the other tube.

13. Apparatus according to claim 12, further comprising sensors associated with said two discharge tubes for signaling functioning anomalies.

14. Apparatus according to claim 1, wherein said second tank comprises a mechanical device for regulating the pressure.

15. Apparatus according to claim 14, wherein said mechanical device for the regulation of the pressure is in air vent connection with said first tank.

16. Apparatus according to claim 15, wherein said vent connection comprises a connecting duct between said mechanical device and said first tank and vent openings of said mechanical device, said openings being normally closed but with the possibility of being opened by means of floats when the level of the water in said second tank reaches preset levels.

17. Apparatus according to claim 16, said openings are two and can be opened in sequence by two floats placed at different heights in said second tank.

18. Apparatus according to claim 1, wherein said first tank contains water at atmospheric pressure.

19. Apparatus according to claim 1, wherein said Venturi tube represents another sector for the dilution of the industrial waste product, said Venturi tube being connected to a first duct that enters a second duct bigger than the first in said first tank so as to block any possible nebulizations due to the impact of the water coming from said first duct with the water of said first tank.

20. Apparatus according to claim 1, wherein said industrial waste product is a gas.

21. Apparatus according to claim 1, wherein said industrial waste product is a liquid.

* * * * *